United States Patent
Hermann et al.

(10) Patent No.: US 9,819,426 B2
(45) Date of Patent: Nov. 14, 2017

(54) SYSTEM AND METHOD FOR REMOTE KEYLESS SYSTEM CHARACTERIZATION

(71) Applicant: Ford Global Technologies, LLC, Dearborn, MI (US)

(72) Inventors: Thomas Joseph Hermann, Troy, MI (US); Tye Arthur Winkel, Canton, MI (US); Mark Wisnewski, Stockbridge, MI (US); Lawrence Banasky, Livonia, MI (US); John Frederick Locke, Waterford, MI (US); Hua Zeng, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/096,984

(22) Filed: Apr. 12, 2016

(65) Prior Publication Data

US 2017/0294973 A1    Oct. 12, 2017

(51) Int. Cl.
*H04B 17/00* (2015.01)
*H04B 17/15* (2015.01)
*G07C 9/00* (2006.01)

(52) U.S. Cl.
CPC ......... *H04B 17/15* (2015.01); *G07C 9/00174* (2013.01); *G07C 2009/00769* (2013.01); *G07C 2009/00984* (2013.01)

(58) Field of Classification Search
CPC ...... G07C 9/00309; G07C 2009/00769; G07C 2009/00984; G07C 5/008; G07C 5/0858;

(Continued)

(56) References Cited

U.S. PATENT DOCUMENTS

| 9,380,540 B1* | 6/2016 | Hermann | H04W 52/18 |
| 2003/0095038 A1* | 5/2003 | Dix | G07C 5/008 |
| | | | 340/425.5 |

(Continued)

FOREIGN PATENT DOCUMENTS

| CN | 202177514 U | 3/2012 |
| CN | 102621976 A | 8/2012 |

(Continued)

OTHER PUBLICATIONS

Search Report dated Jun. 7, 2017 for GB Patent Application No. GB1704753.1 (3 pages).

*Primary Examiner* — Ajibola Akinyemi
(74) *Attorney, Agent, or Firm* — James P. Muraff; Neal Gerber & Eisenberg LLP

(57) ABSTRACT

Various embodiments of the present disclosure provide a system and method for characterizing the radio frequency (RF) functionality of a vehicle remote keyless system (RKS) by separating and precisely characterizing the individual bits of the overall RKS system in an enclosed controlled environment. More specifically, this RKS characterization system includes an enclosed testing chamber for isolating the key fob from the vehicle, and a simulation control system that manipulates RF signals between the key fob and the vehicle for controlled RF signal analysis between the components. In certain embodiments, the RKS characterization system includes an automated process for actuating the key fob. Through this process, the RKS characterization system is able to separately identify the Key Fob Factor, the Vehicle Factor, and the Person Factor, of the vehicle RKS system.

12 Claims, 9 Drawing Sheets

(58) Field of Classification Search
CPC ............ G07C 9/00007; G07C 9/00039; G07C 9/00071; G07C 9/00158; G07C 9/00563; G07C 9/00571; G07C 2009/00317; G07C 2009/00523; G07C 2009/00539
USPC ........................................................ 455/67.1
See application file for complete search history.

(56) References Cited

U.S. PATENT DOCUMENTS

2008/0309565 A1    12/2008   Villarroel et al.
2009/0243796 A1*   10/2009   Tieman .................... B60R 25/24
                                                                             340/5.72

FOREIGN PATENT DOCUMENTS

| CN | 103645732 A | 3/2014 |
| CN | 104571069 A | 4/2015 |
| DE | 102004050846 A1 | 4/2006 |

* cited by examiner

SYSTEM AND METHOD FOR REMOTE KEYLESS SYSTEM CHARACTERIZATION

TECHNICAL FIELD

This application generally relates to a system and method for characterizing the radio frequency function for remote lock, unlock and start functional system for a vehicle.

BACKGROUND

Many vehicles include a remote keyless system (RKS) for enabling access to the vehicle and control of vehicle functions, without using a traditional key or other mechanical device, or otherwise making physical contact with the vehicle. The remote control may be in the form of an independent key fob separate from an ignition key of the vehicle, or a key fob built into the ignition key handle. Conventional remote keyless systems typically include a remote keyless entry system (RKS) for enabling remote, keyless control of the vehicle's doors, including, for example, locking and unlocking the door locks or other electronic locks in the vehicle, opening and/or closing the trunk, tailgate, sliding doors, or other electronically-operated doors.

To ensure that a vehicle's RKS system operates correctly, vehicle manufacturers test and characterize the radio frequency functionality of key fobs within an RKS. Specifically, through certain testing procedures, manufacturers seek to determine the range of distance and sensitivity of a key fob and whether it will communicate with a vehicle in the RKS system. Existing testing procedures for characterizing the range and sensitivity of remote key fobs are time consuming and include many deficiencies. The source of these deficiencies is a testing process that produces outcomes which have a wide distribution of test result outcomes due to various output variations and inefficiencies during the testing procedures. The process also does not provide insights or details required to understand why a device under test fails to meet certain specifications, and which aspect of the system (the key fob, the vehicle, etc.) is responsible.

Accordingly, there is a need for a key fob testing and characterization procedure that can be consistently and efficiently conducted, and that results in data that provides insight into the details required to understand the functionality and limits of each aspect of the remote keyless entry system.

SUMMARY

The appended claims define this application. The Specification summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Various embodiments of the present disclosure provide a system and method for characterizing the radio frequency (RF) functionality of a vehicle remote keyless system (RKS) by separating and precisely characterizing the individual bits of the overall RKS system in an enclosed controlled environment. More specifically, this RKS characterization system includes an enclosed testing chamber for isolating the key fob from the vehicle and a simulation control system that manipulates RF signals between the key fob and the vehicle for controlled RF signal analysis between the components. In certain embodiments, the RKS characterization system includes an automated process for actuating the key fob, thereby eliminating the need for an actual person to conduct any testing and eliminating any variations caused therefrom. Through this process, the RKS characterization system is able to separately identify the Key Fob Factor, the Vehicle Factor, and the Person Factor, of the vehicle RKS system.

In one embodiment, the RKS characterization system breaks the RF path between the key fob and the vehicle by placing either the key fob or the vehicle inside an enclosed testing chamber, and then uses a simulation control system to insert a controlled RF signal into the RF path between the key fob and the vehicle. When the vehicle is placed inside the testing chamber, the key fob is placed outside the chamber in an activation box in a control room. The vehicle is rotated to a plurality of positions, and through a controlled, automated process, the simulation control system of the RKS characterization system collects data regarding the RF transmissions between the vehicle and the key fob at each position. After conducting this test for multiple different RF frequencies and at each position, the entire test is repeated with the key fob inside the testing chamber and the vehicle outside the chamber so that each component is tested separately.

Such a configuration provides a system and method that separates and precisely characterizes each of the individual factors of the overall system, and collects more data in much less time and with fewer persons than existing key fob testing systems and methods.

BRIEF DESCRIPTION OF THE DRAWINGS

For a better understanding of the invention, reference may be made to embodiments shown in the following drawings. The components in the drawings are not necessarily to scale and related elements may be omitted or in some instances proportions may have been exaggerated so as to emphasize and clearly illustrate the novel features described herein. In addition, system components can be variously arranged as known in the art. Further, in the drawings, like reference numerals designate corresponding parts throughout the several views.

DETAILED DESCRIPTION OF EXAMPLE EMBODIMENTS

Figure 1:
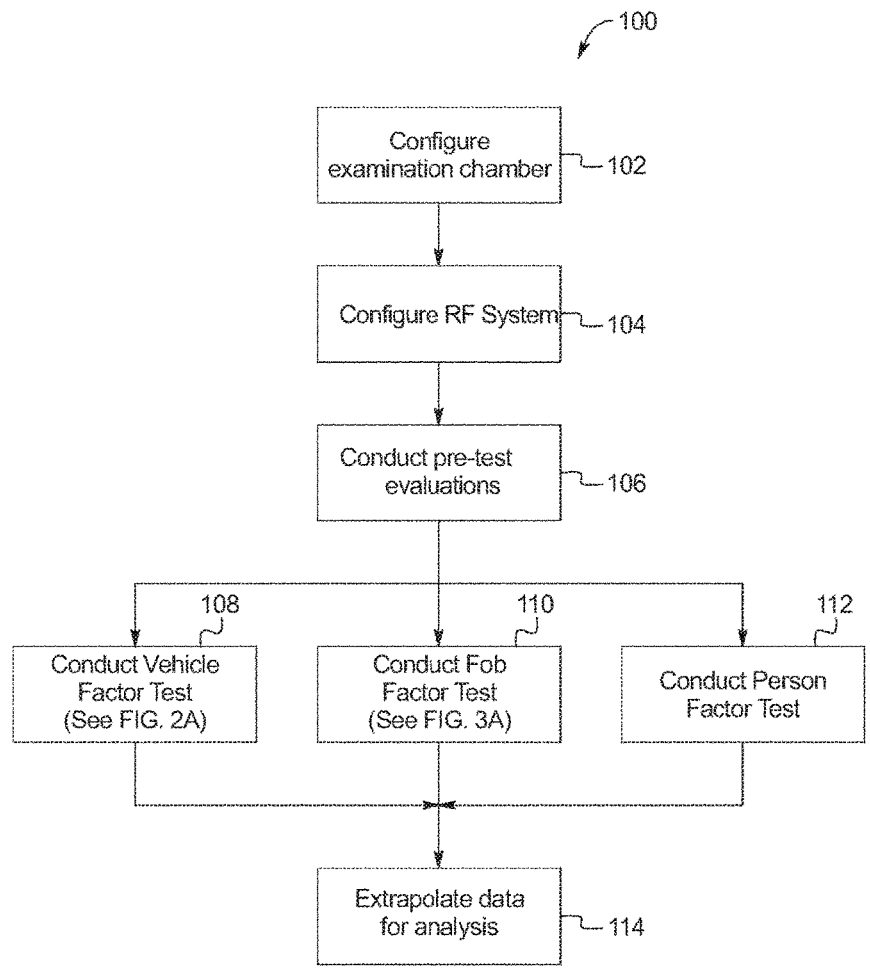
FIG. 1 is a flow chart of an example process or method of operating an embodiment of the remote keyless entry characterization system of the present disclosure, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Many vehicles include a remote keyless system (RKS) for enabling access to the vehicle and control of vehicle functions, without using a traditional key or other mechanical device, or otherwise making physical contact with the vehicle. Instead, these systems include a key fob, which provides a user with remote, keyless control of the various vehicle operations or functions and communicates command inputs, such as lock, unlock, engine start, which are entered into the key fob and transmitted to the vehicle. In certain embodiments, the key fob may be pre-configured to enable direct control of these operations of the vehicle by the vehicle manufacturer or an entity associated therewith. As will be appreciated, other vehicle functions may be controllable by the key fob and the present disclosure is intended to cover any and all such key fob operations.

Existing systems and methods for testing key fob functionality for remote keyless entry systems include: (1) establishing various distance points away from and around a vehicle, (2) having an actual person move to each distance point and press an input on the key fob, and (3) determining whether the vehicle responds or not. A major shortcoming of such existing testing methods is that the results are limited to a list of distance points where the key fob worked and did not work. The test results do not provide insights as to why a specific distance requirement is not being met, and which aspect of the system (the key fob, the vehicle, or the person) is responsible.

Furthermore, such a testing procedure is time consuming and the results from such testing may be unreliable because there are many external variables that may impact results. For example, the existing testing methods are not conducted in a controlled environment, but instead are conducted in a public parking lot. As such, it is impossible to account for variations in the test results due to factors such as weather changes from test to test, effects of weather on persons conducting the test, surface condition changes due to weather, interference from external transmitters such as cellular towers that are operating in a similar frequency band, other RKS transmitters operating in the area, and various other factors. Additionally, the person holding the key fob may cause variations in the test results, such as, for example, RF output variations due to the person holding the key fob differently during the test and from test to test, person to person variations in holding the key fob, physical differences in height above the surface of the earth, arm length, hand sizes of each person. Other factors that are difficult to isolate and cause variations in the test results include: key fob state of charge during the testing, orientation of the key fob, inconsistencies in distances between the key fob and the vehicle from test to test, and vehicle positioning inaccuracies.

Various embodiments of the present disclosure addresses each of these deficiencies by providing a system and method for characterizing the radio frequency (RF) functionality of a vehicle remote keyless system (RKS) by separating and precisely characterizing the individual bits of the overall system in an enclosed controlled environment. More specifically, this RKS characterization system includes an enclosed testing chamber for isolating the key fob from the vehicle and a simulation control system that manipulates RF signals between the key fob and the vehicle for controlled RF signal analysis between the components. In certain embodiments, the RKS characterization system includes an automated process for actuating the key fob, thereby eliminating the need for an actual person to conduct any testing and eliminating any variations caused therefrom. Through this process, the RKS characterization system is able to separately identify the Key Fob Factor, the Vehicle Factor, and the Person Factor, of the vehicle RKS system.

In one embodiment, the RKS characterization system includes an enclosed, weather-proof, RF clean examination chamber, an RF transceiver, and a simulation control system. In this embodiment, the simulation control system includes a computing device (such as the computing device described in connection with FIG. 6) for controlling the RF signals between the key fob and the vehicle, and for communicating with testing hardware and various controllers of the RKS characterization system. In this embodiment, the RKS characterization system breaks the RF path between the key fob and the vehicle by placing either the key fob or the vehicle inside the testing chamber, and then uses the simulation control system to insert a controlled RF signal into the testing chamber. When the vehicle is placed inside the testing chamber, the key fob is placed outside the chamber in an activation box in a control room. The vehicle is rotated to a plurality of positions, and through a controlled, automated process, the simulation control system of the RKS characterization system collects data regarding the RF transmissions between the vehicle and the key fob at each position. After conducting this test for multiple different RF frequencies and at each position, the entire test is repeated with the key fob inside the testing chamber and the vehicle outside the chamber so that each component is tested separately.

Such a configuration enables separation of each factor of the RKS system, and individualized analysis about each factor. Such a configuration also provides more data over a shorter period of time through a reliable, consistent process. For example, the requirement today is that a certain percentage of points around a vehicle must meet a minimum distance requirement. For example, 70% of 22 points around a vehicle must meet at least 300 feet. If an RKS system of a vehicle does not meet requirements, the RKS characterization system of the present disclosure can determine which bit is responsible.

FIG. 1A illustrates a flow chart of an example process or method 100 of operating the RKS characterization system of the present disclosure. Although process 100 is described with reference to the flowchart shown in FIG. 1, many other processes of performing the acts associated with process 100 may be employed. For example, the order of certain of the illustrated blocks may be changed, certain of the illustrated blocks may be optional, or certain of the illustrated blocks may not be employed.

In operation of this embodiment, the process 100 of operating the RKS characterization system of the present disclosure includes configuring an examination chamber, as indicated by block 102. More specifically, the examination chamber (also referred to herein as the "testing chamber") provides a controlled, enclosed, weather proof, RF clean environment free from outside RF noise sources. For example, the testing chamber is free from RF noise that is ordinarily present in the outdoors, such as noise caused by radio stations, other vehicles, etc. In certain embodiments, the testing chamber further includes an RF absorber that eliminates any reflection of RF noise within the chamber and provides more consistency during testing. In certain embodiments, the testing chamber is 30 meters long. Through RF signal manipulation using the simulation control system, the 30 meter testing chamber provides the same, or greater, range of testing as the open parking lot testing of existing testing models. The testing chamber of the RKS characterization system eliminates the deficiencies due to extraneous noise from the open parking lot testing of existing testing methods, and provides more consistent and reliable results.

Configuring the examination chamber also includes configuring a key fob activation box. In certain embodiments the key fob activation box is inside the testing chamber. In other embodiments, the key fob activation box is in a separate control room. More specifically, as described in greater detail below, the key fob activation box is a fixture used to actuate the key fob during the RKS characterization testing. The key fob activation box is configured differently for the various tests (i.e., Vehicle Factor test vs Key Fob Factor test) of the RKS characterization system. In both the Key Fob Factor test and the Vehicle Factor test, the key fob activation box includes a device to actuate the key fob without interfering with its RF functionality. For example, in certain embodiments, this would be accomplished by using non-conductive materials, such as plastic or rubber tubing and pneumatic actuation. For the key fob factor test, the key fob is placed inside the testing chamber in an activation box to provide controlled automated activation of the key fob inputs, and the vehicle is kept outside of the testing chamber. By contrast, for the vehicle factor test, the vehicle is placed inside the testing chamber and the key fob is placed in an activation box in a control room to provide controlled automated activation of the key fob inputs. In certain embodiments, for the Vehicle Factor test the key fob activation box includes a transducer to transmit and receive RF signals to and from the key fob. In certain embodiments, for the Vehicle Factor test, the key fob activation box is configured as a small shielded enclosure with RF absorbers inside of it.

As described in greater detail below, in one embodiment, the testing chamber includes a turntable for rotating the object inside the testing chamber during testing, and a turntable controller for operating the turntable during the testing procedure. The testing chamber further includes at least one antenna inside the testing chamber for transmitting and receiving RF signals to and from the key fob or vehicle when inside the testing chamber.

It should be appreciated that the antennas and transmit equipment of the RKS characterization system are capable of covering the desired frequency range and bandwidth to mimic that of a vehicle and key fob. The RF transceiver used in the test system are capable of generating sufficient power levels to properly determine the threshold value of minimum RF functionality.

Configuring the examination chamber includes configuring the components outside of the examination chamber that are utilized for RKS characterization. For example, in one embodiment, the testing chamber includes cables that are run through the floor of the testing chamber for connecting the antennas inside and outside of the chamber. Furthermore, configuring the examination chamber also includes configuring the simulation control system for operating the RKS system. The simulation control system includes a computing device (such as computing device 600 described in connection with FIG. 6) for controlling the components of the RKS characterization system and for collecting data from the RKS characterization system.

Configuring the examination chamber also includes attaching confirmation equipment to determine feedback of the vehicle response to the key fob button press. In certain embodiments, this equipment includes audio and visual recording devices that transmit the information via fiber optic lines that are run outside of the chamber to the control room. In other embodiments, this includes a light sensor or a horn honk.

After configuring the examination chamber, the process 100 of operating the RKS characterization system of the present disclosure includes configuring the RF system, as indicated by block 104. The RKS characterization system of the present disclosure characterizes the RF functionality of the key fob and the vehicle in an RKS system by testing and analyzing RF transmissions between the key fob and the vehicle in a controlled environment. This is possible through the creation of a custom digital signal processor within the simulation control system that controls the RF signal inserted between the key fob and the vehicle. More specifically, by placing either the vehicle or the key fob within the testing chamber, the RKS characterization system breaks the RF path between the key fob and vehicle and restricts all RF communication between the key fob and vehicle, except through the simulation control system. Through this novel system the unknown encoded secure key fob and vehicle RF control wireless communication is captured, copied, stored, manipulated and retransmitted at will, without having to know any details about the communications.

Configuring the RF system includes configuring the one or more RF transceivers of the RKS characterization system. Each RF transceiver both transmits and receives RF signals between the key fob and the vehicle. The RF transceiver is controlled by the simulation control system. More specifically, the transceiver is controlled by a processor within a computing device of the simulation control system (such as computing device 600 explained in connection with FIG. 6). In certain embodiments, the RF transceivers are in a control room outside of the testing chamber. The RF transceivers are unique in that they are set up for three or four frequencies, and may be configured to enable two-way communication through a repeater system. More specifically, the RF repeater is configured to capture an RF signal from an antenna, record it and replay the RF signal. Using the simulation control system, the magnitude of the captured RF signal may be increased and decreased as necessary for testing. By manipulating the strength of the RF signal, the RKS characterization system can test a range of RF signal strength within a testing chamber of limited length. In one example embodiment, the testing chamber is 30 meters long. This repeater enables two-way testing between the key fob and the vehicle.

In order to ensure that this process is conducted accurately, configuring the RF system also includes verifying the RF link before each RF examination. In one embodiment, the RF link verification for the key fob includes cycling through four different frequencies and verifying the key fob to receive signals at each frequency. In this embodiment, the RF link verification for the testing chamber includes transmitting single CW frequencies from a 10 meter antenna to the RF link. It should be appreciated that typically there will only be one frequency that the vehicle responds to and a separate frequency that the vehicle transmits that the fob receives for confirmation. For example, at 434 MHz the key fob transmits and the vehicle receives the signal for confirmation. In this same example, at 902 MHz the vehicle transmit and the key fob receives the signal for confirmation. It should be appreciated that in certain embodiments, the RF link verification is configured to the appropriate frequency rather than being cycled through a plurality of frequencies.

After verifying the RF connections of the RKS characterization system, the process 100 includes conducing pre-test evaluations, as indicated by block 106. More specifically, the RKS characterization system identifies the frequency of the key fob prior to testing by actuating a key fob input and capturing the emitted signal from the key fob. Once the frequency is identified, the RKS characterization system is capable of setting all RF conditions automatically. Through such a configuration, the RKS characterization system creates a simulated environment for testing purposes without the use of any special key fob, or any special vehicle software or hardware, and even without the use of any specific security codes. In certain embodiments, the RKS system further includes measuring the response frequency from the vehicle as it may be a different frequency than the response from the key fob. Such measurements may be supplemented by information provided by the supplier in a hardware specification.

After configuring the testing chamber, verifying the RF link functionality, and conducting pre-test evaluations, the process 100 of operating the RKS characterization system includes testing each the specific factor. More specifically, the process 100 includes conducting the Vehicle factor test, as indicated by block 108, separate from conducting the Fob Factor Test, as indicated by block 110, and in certain embodiments, also conducting the Person Factor test, as indicated by block 112. The Vehicle Factor refers to the radio frequency functionality as it is integrated within the vehicle (i.e., antenna placement, RF noise due to other vehicle components). The Vehicle Factor test is explained in greater detail in connection with FIGS. 2A and 2B. The Fob Factor refers to the RF functionality of the key fob alone. The Fob Factor test is explained in greater detail in connection with FIGS. 3A, 3B, and 3C. The Person Factor refers to the effect that a person has on the RF response of the system as the person, actuates, holds or carries the fob. In certain embodiments, a person is not involved in the Person Factor test. In one such embodiment, the key fob may be placed in or adjacent to material that represents the effect that a person would have on the RF performance of the fob in various scenarios.

It should be appreciated that for both the Vehicle Factor test and the Fob Factor test, the RKS characterization system and method does not include an actual person. Removing the persons from the process removes certain sources of variations within the system. These variations can be due to physical differences between people as well as differences in how a person holds and controls the key fob. These characteristics are able to be discovered and documented with precision using the RKS characterization system and method of the present disclosure.

In certain embodiments, only the Fob Factor and the Vehicle Factor are tested and characterized. In certain alternative embodiments, the Person factor is also analyzed, and would require an actual person for the testing. The Person factor test would be conducted to measure vertical and horizontal key fob emissions, and minimum sensitivity for two-way communication with the vehicle, with a person holding the key fob.

After conducting the different factor-specific tests, the process 100 includes extrapolating data for analysis, as indicated by block 114. By collecting and analyzing the data from this novel process, the RKS characterization system enables the use of standard RF calculations to estimate expected range of the system in the real world. If one discovers certain outcomes do not meet newly created requirements which match the novel processes outcomes, then precise mitigation changes can be listed above. It should be appreciated that there will be a correlation between the power required to elicit a response from the device and the range that will be achieved outside. In certain embodiments, this information is provided through a reference table to be used when the data is extrapolated for analysis.

There are several benefits to such automated indoor characterization of the key fob and the vehicle factors. For example, weather is no longer a factor. With existing RKS testing systems, weather may influence the results of an RKS test, or may prevent an RKS test altogether since existing RKS tests are conducted outside in an open parking lot. With full automation, the vehicle and personnel schedule is more easily managed than with existing systems. Furthermore, the testing requires much less time and provides much more data regarding each factor. All RF frequencies and modulation types and frequencies (including competitive vehicles) can be characterized through this process. Furthermore, there is no special software or hardware required.

Figure 2A:
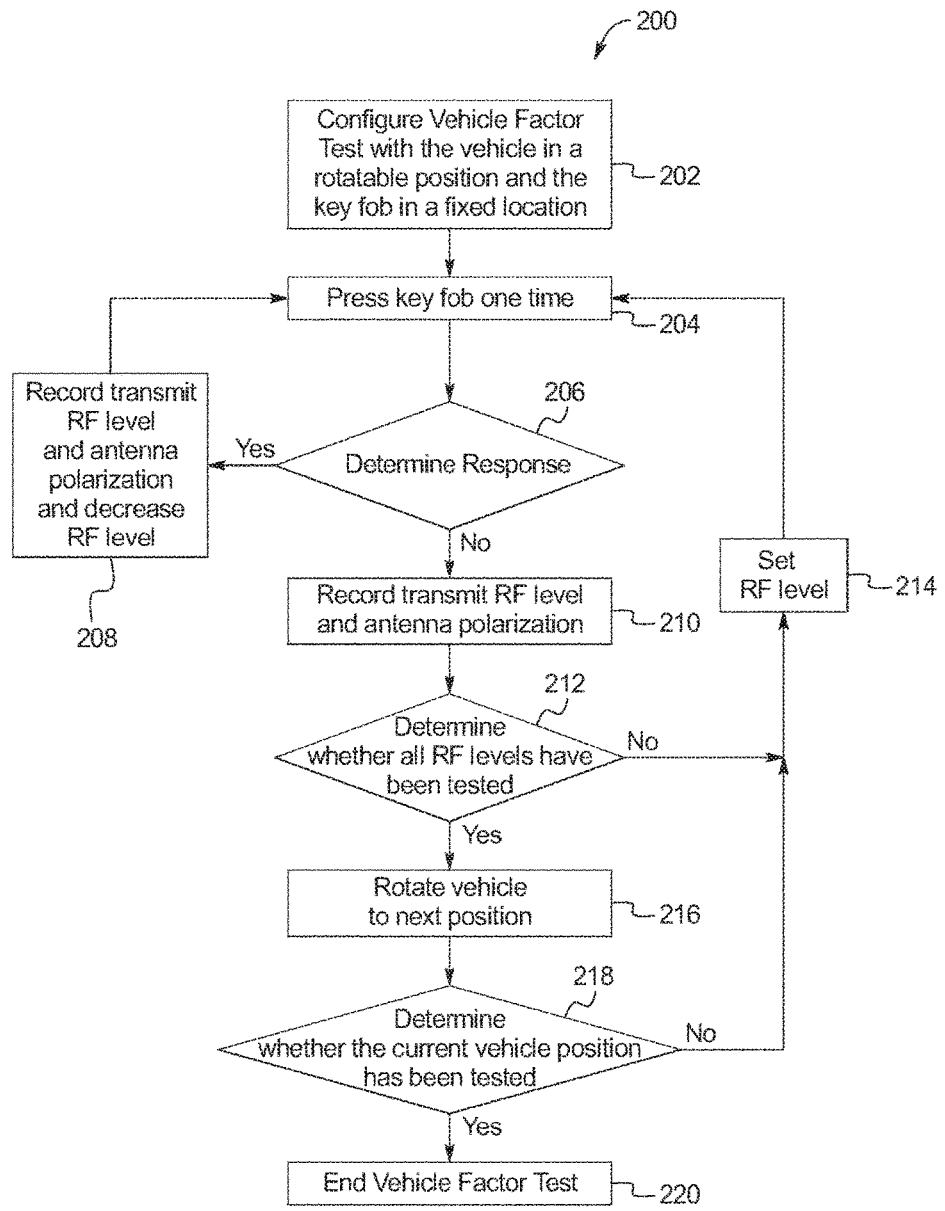
FIG. 2A is a flow chart of an example process or method of operating an embodiment of the remote keyless entry characterization system for a Vehicle Factor test, in accordance with certain embodiments.
Figure 2B:
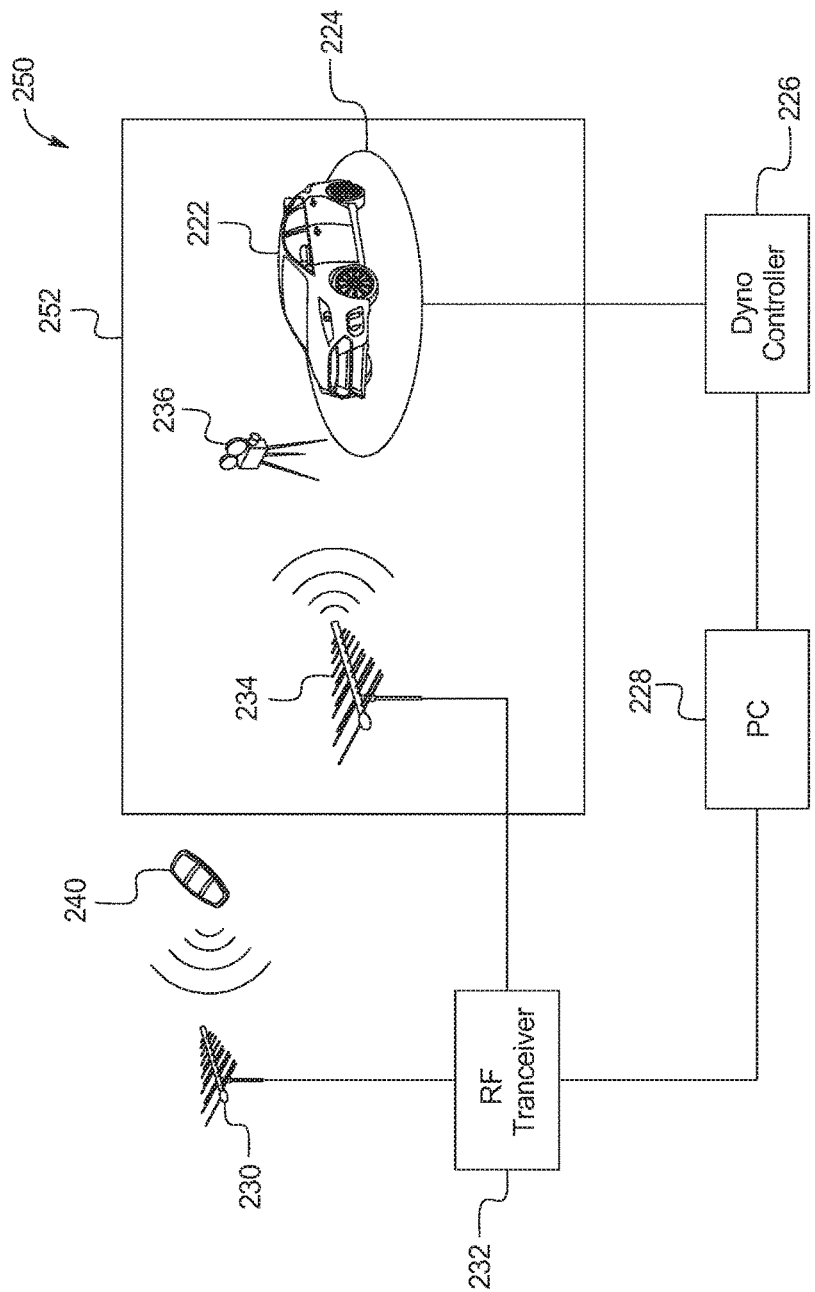
FIG. 2B illustrates an example embodiment of the Vehicle Factor test of the remote keyless entry system of FIG. 1, in accordance with certain embodiments.

Turning to FIGS. 2A and 2B, which illustrate an example embodiment of the Vehicle Factor test portion of the RKS characterization system and method of the present disclosure. Analysis of the RF functionality of the Vehicle Factor includes, but is not limited to, polarization output power and receiving sensitivity characteristics of the vehicle at each of a plurality of positions. FIG. 2A illustrates a flow chart of an example process 200 of conducting the Vehicle Factor test according to one embodiment of the present disclosure. FIG. 2B illustrates an example embodiment of the RKS characterization system 250 configured for a Vehicle Factor Test.

As illustrated in FIG. 2B, the RKS characterization system as configured for a Vehicle Factor test, includes a testing chamber 252, a vehicle 222, a remote key fob 240, and an RF transceiver 232 in communication with at least two antennas 234, 230. More specifically, as described in greater detail below, the RF transceiver 232 captures an RF signal from the key fob 240, and stores, controls, and replays the RF signal to the vehicle 222 inside the enclosed testing chamber.

As illustrated in FIG. 2A, in operation of this embodiment, the process 200 includes configuring the vehicle factor test with the vehicle 222 in a rotatable position within the testing chamber 252, and the key fob 240 in an activation box (not shown) in a control room outside of the testing chamber 252, as indicated by block 202. That is, as described in connection to FIG. 1, the testing chamber 252 is configured to be weather proof and RF clean environment. In addition to these configurations, the testing chamber 252 is arranged differently for each specific factor test. For the Vehicle Factor test, the vehicle 222 is isolated so that it can be analyzed independent of the other factors of the RKS characterization system.

As illustrated in FIG. 2B, for the Vehicle Factor test, the vehicle 222 is placed in the testing chamber 252 in a rotatable position. In this embodiment, this is accomplished by placing the vehicle 222 on top of a turntable 224. In this embodiment, the turntable is a dyno 224, which is configured to rotate the vehicle 360 degrees through a dyno controller 226. In this embodiment, the dyno controller 226 is configured to rotate the vehicle 360 degrees in 1 degree increments. The vehicle begins at a first position on the dyno 324. The RKS characterization system as configured for the Vehicle Factor test further includes a simulation control system, which is represented in this embodiment as the PC 228. The simulation control system 228 is configured to communicate with the RF transceiver 232, and the dyno controller 226 to control the Vehicle Factor test and to collect data from the Vehicle Factor test. It should be appreciated that no special hardware or software components are required for the Vehicle Factor test portion of the key fob characterization system and method of the present disclosure. The RKS characterization system and method of the present disclosure may be conducted using the same testing hardware (RFI testing hardware) that is currently being used for existing testing methods.

Turning back to FIG. 2A, after the Vehicle Factor test is configured, the process 200 includes pressing the key fob 240 one time, as indicated by block 204. More specifically, in certain embodiments, the key fob 240 is placed in an activation box in a control room where an input on the key fob 240 is automatically actuated. The automatic actuation of the key fob 240 input, through the simulation control system 228, is a unique aspect of the RKS characterization system that eliminates the requirement of an actual person. Such a configuration further eliminates any discrepancies in the data caused by the variability of actual persons used for testing.

Each time the key fob 240 is actuated, an RF signal is transmitted to the vehicle 222. More specifically, as described above in connection with FIG. 1, before conducting any of the specific factor tests, the RKS characterization conducts pre-test evaluations where the RKS characterization system identified the frequency of the key fob 240. Once the frequency is identified, the RKS characterization system sets all RF conditions automatically through the simulation control system. In this example embodiment, the RF transceiver 232 captures the signal from the key fob 240 through an antenna 230 outside of the chamber 252, and transmits the signal to the vehicle through a second antenna 234 is inside the chamber 252. Once the RF signal has been captured by the RF transceiver 232, the simulation control system 228 stores, controls, and replays the captured fob signal through the second antenna 234 inside the testing chamber 252 to the vehicle 222. In certain embodiments, the frequency of the system is fixed for the testing based on the pretest RKS characterization step. In such embodiments, the amplitude of the output is adjusted at each position.

Through such a configuration, the RKS characterization system of the present disclosure creates a simulated environment for testing purposes without the use of any special key fob, or any special vehicle software or hardware, and even without the use of any specific security codes.

After the key fob is pressed, the process 200 includes determining the response, as indicated by diamond 206. In one embodiment, determining the response refers to determining whether the vehicle responded. More specifically, when the key fob is actuated, a signal is transmitted from the key fob and received by the vehicle, and the vehicle responds either by outputting a confirmation signal, or by completing the command, or both. For example, if the door unlock input on the key fob is actuated, a signal for the command to unlock the doors is sent from the key fob to the vehicle. When the vehicle receives this command, the vehicle completes the command by unlocking the doors or flashing the headlights to confirm receipt of the command signal, or both flashes the headlights and unlocks the door.

As illustrated in FIG. 2B, in this embodiment a camera 236 capturing any responses by the vehicle 222. The camera 236 represents video monitoring. It should be appreciated that in certain embodiments, when testing each component, the response may be monitored by an actual person or by video cameras. This allows testing to be conducted without the use of personnel or to allow for multiple tests to be run at the same time and have reduced personnel for reviewing the results.

In certain embodiments, test software can be configured to automatically determine response by setting up video or audio masks (triggers). Likewise, in certain embodiments, the CAN bus or other communication protocols can be monitored to determine vehicle response; however, this is not typically necessary.

Through this automatic monitoring of the vehicle response to the key fob press provides the necessary automatic closed loop feedback to scale or change the magnitude of the RF signals, either lower or higher in magnitude, until the vehicle factor is identified. More specifically, if the vehicle responds, the process 200 includes recording the RF transmission level and the antenna polarization and decreasing the RF level, as indicated by block 208. After decreasing the RF level, the process 200 includes returning to block 204 and pressing the key fob again at the new decreased RF level, as illustrated in FIG. 2A. This is so that the vehicle 222 response to the key fob is tested at a range of RF levels at each position on the dyno 224. It should be appreciated that this process of testing at a range of RF levels is so that the RKS characterization system determines a "threshold level" of RF activation, or the minimum level required to elicit a response. In certain embodiments, to determine the threshold level or minimum level, the amplitude level will be set to a baseline level and raised until a response is observed. In such an embodiment, the amplitude is then lowered in finer steps until there is no response.

If, on the other hand, the vehicle does not respond to the key fob at a specified RF level, the process 200 includes recording the RF transmission level and the antenna polarization, as indicated by block 210. After recording the data for that RF level, the process 200 includes determining whether all RF levels for this position have been tested, as indicated by diamond 212. If all RF levels have not been tested, the process 200 includes setting the RF level, as indicated by block 214, and returning to block 204 to press the key fob again. In certain embodiments, this step includes setting the RF level to a base testing level for the new position. In certain embodiments, this step includes increasing the RF level and pressing the key fob at the new increased RF level.

If, on the other hand, the key characterization system determines that all RF levels have been tested, the process 200 includes rotating the vehicle 222 to the next position, as indicated by block 216. After rotating the vehicle 222 to the next position, the process 200 includes determining whether the current vehicle position has been tested, as indicated by diamond 218. The Vehicle Factor test measures and records data related to the polarization output power and receiving sensitivity as fine as 360 degrees in 1 degree increments around key fob as well as above and below a specified horizon, in 1 degree increments.

It should be appreciated that in certain embodiments the entire test (i.e., all positions) is performed in a set polarization and then repeated in another polarization. In another embodiment, each desired polarization is measured at each position. For example, the RKS characterization system determines the threshold levels at each position for horizontal polarization, and determines the threshold values for vertical polarization at each position. In another embodiment, the RKS characterization system determines the threshold level for horizontal polarization at 0 degrees, then switch to vertical polarization and find the threshold level at that same position before moving to 1 degree and repeating the process.

Once the vehicle is rotated to a position for which data has already been collected, the process 200 includes ending the Vehicle Factor test, as indicated by block 220.

The data collected from the vehicle factor test provides information regarding the range of sensitivity for the RF functionality of the vehicle 222. The data collected from the Vehicle Factor test may provide information regarding vertical and horizontal polarization preferences for certain sides of the vehicle (driver's side vs. passenger side), maximum power or minimum sensitivity, and directionality of the RF function of the vehicle. The collected data may also be used to determine ideal antenna placement within the vehicle for optimal reception from the key fob. This would be accomplished by physically relocating the vehicle RKS transceiver and associated wiring to various locations within the vehicle and repeating the test.

Figure 3A:
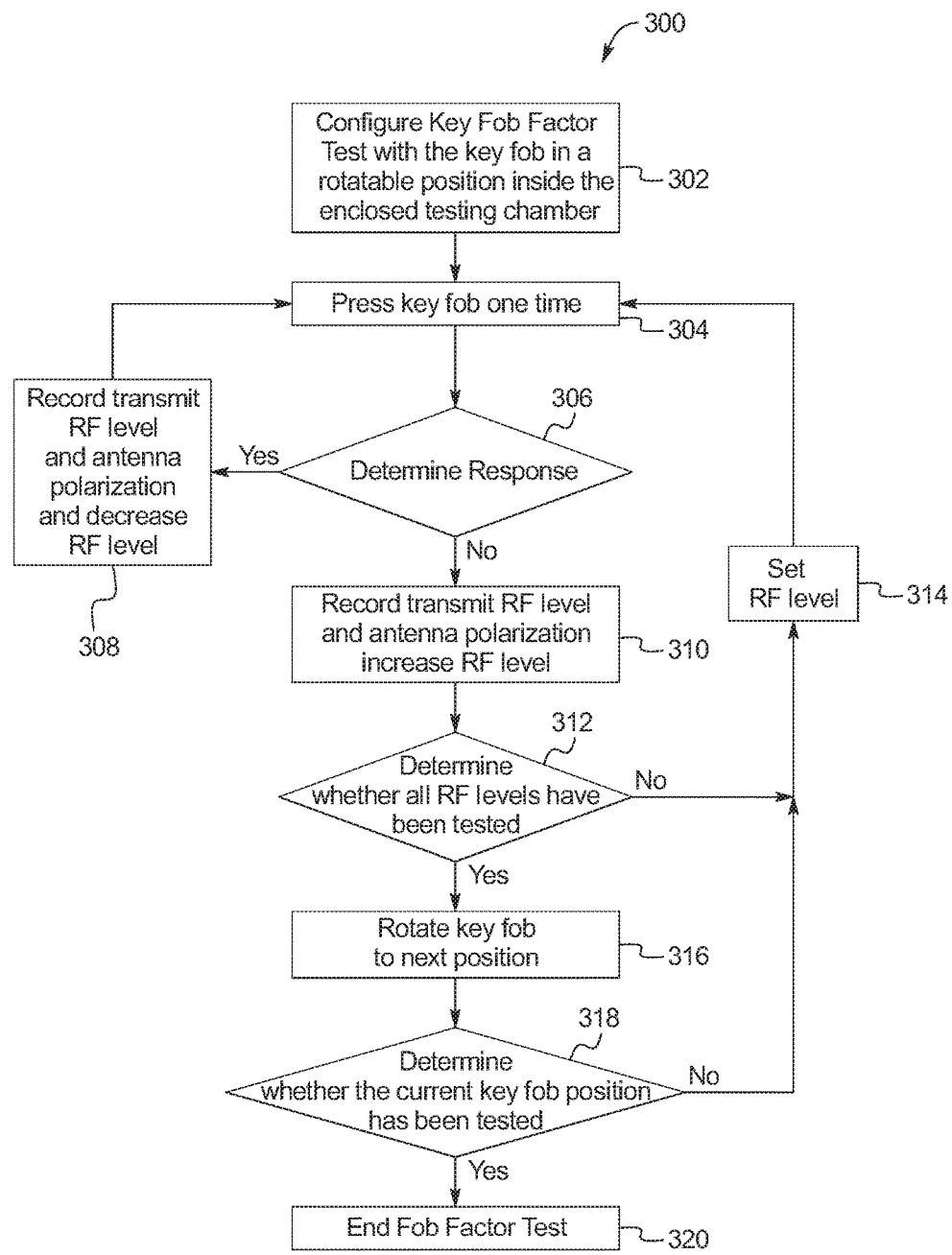
FIG. 3A is a flow chart of an example process or method of operating an embodiment of the remote keyless entry characterization system for a Key Fob Factor test, in accordance with certain embodiments.
Figure 3B:
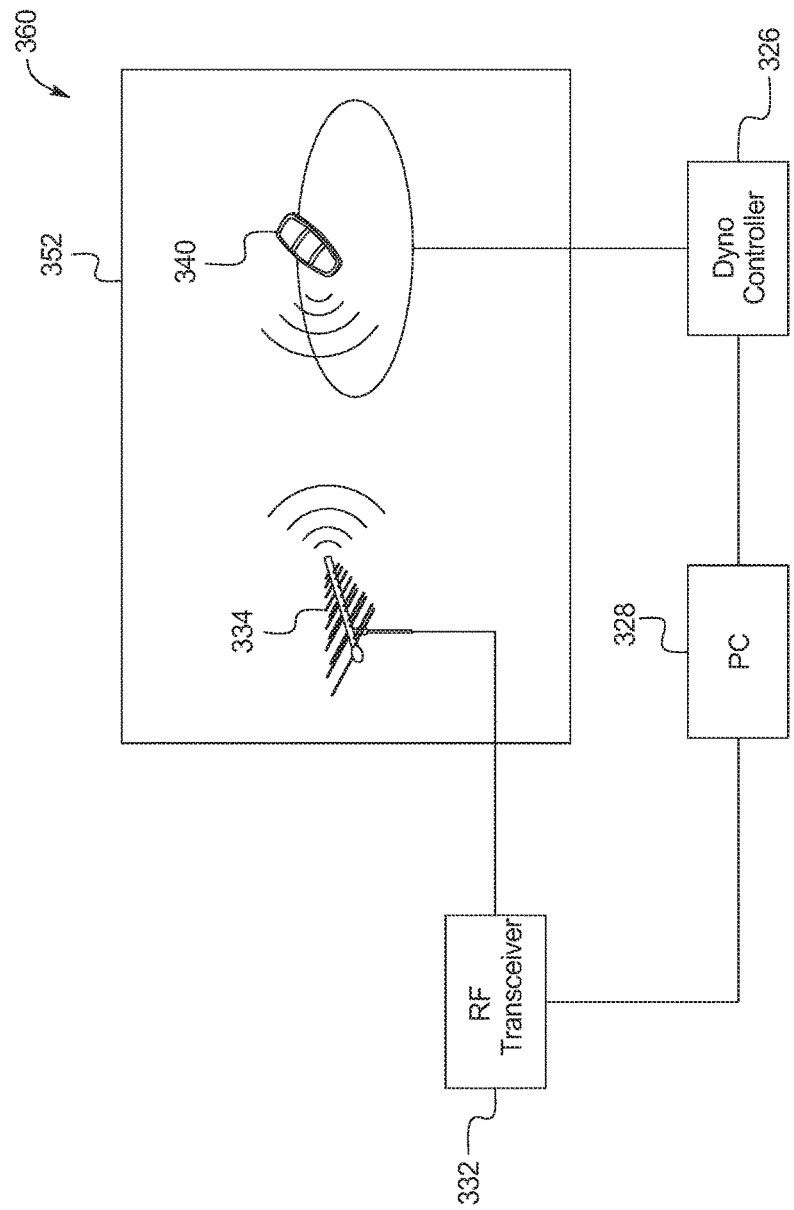
FIG. 3B illustrates an example embodiment of a one-way Key Fob Factor test of the remote keyless entry system of FIG. 1, in accordance with certain embodiments.
Figure 3C:
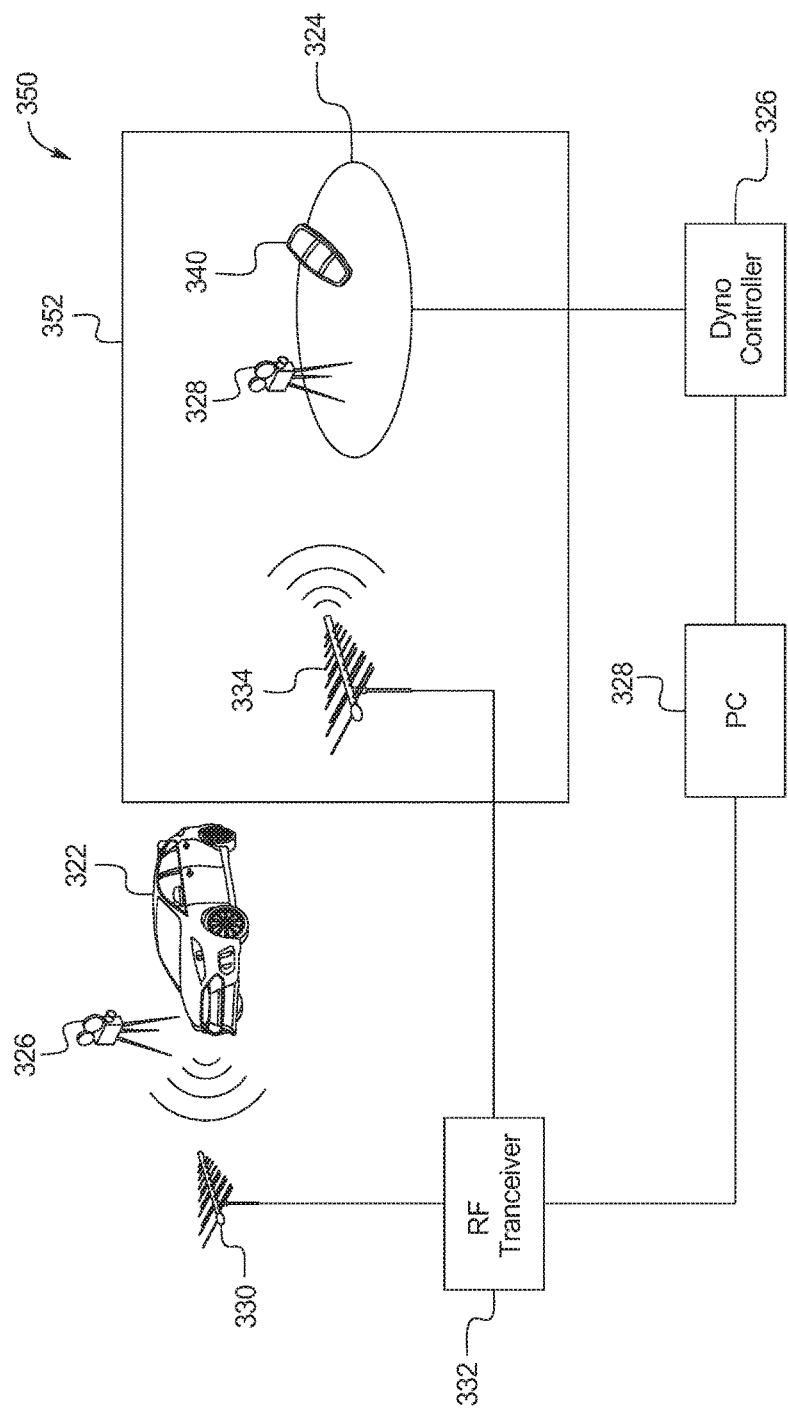
FIG. 3C illustrates an example embodiment of a two-way Key Fob Factor test of the remote keyless entry system of FIG. 1, in accordance with certain embodiments.

Turning to FIGS. 3A, 3B and 3C, which illustrate example embodiments of the Fob Factor test portion of the RKS characterization system and method of the present disclosure. Analysis of the RF functionality of the Fob Factor includes, but is not limited to, polarization output power and transmitting sensitivity characteristics of the key fob at each of a plurality of positions. Two of the variations in testing data due to the key fob include the state of charge, whether the key fob is held or suspended. The RKS characterization system of the present disclosure eliminates these sources of variation by replacing the battery of each key fob prior to testing, and by placing the key fob in an activation box where the key fob is actuated through a consistent and automated process. FIG. 3A illustrates a flow chart of an example process 300 of conducting a one-way Fob Factor test according to one embodiment of the present disclosure. FIG. 3B illustrates a first example embodiment of the RKS characterization system 360 configured for one-way Fob Factor Test.

FIG. 3C illustrates a second example embodiment of the RKS characterization system 350 configured for a one-way and/or two-way Fob Factor Test. Key fob functionality may include one-way communication, and two-way communication. More specifically, in certain embodiments, in response to an input to the key fob for a command, the key fob transmits a signal to the vehicle and the vehicle completes the command. This is referred to as one-way communication. In certain embodiments, the vehicle sends a confirmation signal back to the key fob and the key fob receives that confirmation command. This is referred to as two-way communication. For example, in certain embodiments, when the vehicle receives the signal from the key fob, the vehicle transmits a confirmation signal to the key fob, and the key fob outputs a signal so the user is notified that the command sent from the key fob has been received by the vehicle. In certain embodiments, the key fob output may be a visual, audible, and/or haptic cue provided by an output device of the key fob to indicate receipt of the mobile link input to the user of the key fob. In certain embodiments, the vehicle sends a signal to the key fob when the command is completed.

Turning first to FIGS. 3A and 3B, which illustrate a flow chart and an example configuration of the RKS characterization system configured for a one-way fob factor test. As illustrated in FIG. 3B, this embodiment the RKS characterization system 360 as configured for a one way Fob Factor test includes a testing chamber 352, a remote key fob 340 on a turntable 324, and at least one RF transceiver 332 in communication with an antenna 334 inside the testing chamber 352. In this embodiment, the turntable 324 is a dyno 324. A dyno controller 326 is used to rotate the object (in this case, the key fob 340) inside the testing chamber 352 based on the factor being tested. The PC 328 represents the simulation control system, which includes a computing system (such as computing system 600 described below) and hardware (such as RFI test hardware) for conducting the key fob characterization testing and analysis according to one embodiment. As described above with respect to the Vehicle Factor test, no special hardware or software components are required for Fob Factor test portion of the key fob characterization system and method of the present disclosure. The Fob Factor test, like the Vehicle Factor test of the RKS characterization system and method of the present disclosure may be conducted using the same testing hardware that is currently being used.

As illustrated in FIG. 3A, in operation of this embodiment, the process 300 includes configuring the Fob Factor test with the key fob 340 in a rotatable position inside the testing chamber 352, as indicated by block 302. For the Fob Factor test, the key fob 340 is isolated inside the testing chamber 352 so that it can be analyzed independent of the other factors of the RKS characterization system.

As illustrated in FIG. 3B, for the Fob Factor test, the key fob 340 is placed in the testing chamber 352 in a rotatable position. In one embodiment, this is accomplished by placing the key fob 340 on top of a turntable such as a dyno 324, which is configured to rotate the vehicle 360 degrees through a dyno controller 326. The key fob 340 begins at a first position on the dyno 324. It should be appreciated that FIG. 3B does not depict a vehicle. FIG. 3B illustrates one embodiment of a one-way Fob Factor test designed to analyzing the RF functionality of the key fob 340 output separate from any vehicle response. In certain embodiments, even without the vehicle present, such a set up may be utilized for two-way testing. In such an embodiment, the antenna and RF test equipment is capable of both transmitting and receiving signals to and from the fob. It should be appreciated however, in certain embodiments even though the vehicle is not illustrated, in this embodiment; a vehicle is still monitored to determine the vehicle response when the key fob 340 is actuated so that successful RF signal transmission may be recorded.

Turning back to FIG. 3A, after the Fob Factor test is configured, the process 300 includes pressing the key fob 340 one time, as indicated by block 304. More specifically, in this embodiment, the key fob 340 is automatically actuated through the simulation control system 228 so as to eliminate the requirement of an actual person and any discrepancies in the data caused by the variability of actual persons used for testing. Each time the key fob 340 is actuated, an RF signal is transmitted from the key fob 340 inside the testing chamber 352 to a vehicle in a fixed location outside of the testing chamber 352. In this example embodiment, the RF transceiver 332 captures the signal from the key fob 340 through an antenna 334 inside of the chamber 352. It should be appreciated that for the Fob Factor test, the focus is on the key fob 340, but there is still a need for the key fob 340 to interact with the vehicle 322. The vehicle 322 is used to verify reception of the key fob 340 signal and to provide the proper response signal to verify reception by the key fob 340 and record the threshold value of the amplitude required to elicit a response.

Through such a configuration, the RKS characterization system of the present disclosure creates a simulated environment for testing purposes without the use of any special key fob, or any special vehicle software or hardware, and even without the use of any specific security codes.

After the key fob is pressed, the process 300 includes determining a response, as indicated by diamond 306. More specifically, in this example embodiment this step includes determining whether the vehicle responded. As with the Vehicle Factor test, in certain embodiments, the vehicle response may be monitored by a person or by a camera recording the vehicle. If the vehicle responds, the process 300 includes recording the RF transmission level and the antenna polarization and decreasing the RF level, as indicated by block 308. After decreasing the RF level, the process 300 includes returning to block 304 and pressing the key fob 340 again at the new decreased RF level, as illustrated in FIG. 3A. This is so that the key fob 340 is tested for a range of RF levels at each position.

If, on the other hand, the vehicle does not respond to the key fob 340 at a specified RF level, the process 300 includes recording the RF transmission level and the antenna polarization, as indicated by block 310. After recording the data for that RF level, the process 300 includes determining whether all RF levels for this position have been tested, as indicated by diamond 312. More specifically, a range of RF levels are tested so that the threshold level (i.e., the minimum power level required to elicit a response) may be determined. If all RF levels have not been tested, the process 300 includes setting the RF level, as indicated by block 314, and returning to block 304 to press the key fob 340 again. In certain embodiments, this step includes setting the RF level to a base testing level for the new position. In one embodiment, this step includes increasing the RF level and pressing the key fob at the new increased RF level.

If, on the other hand, the RKS characterization system determines that all RF levels have been tested, the process 300 includes rotating the key fob 340 to the next position, as indicated by block 316. After rotating the key fob 340 to the next position, the process 300 includes determining whether the current vehicle position has been tested, as indicated by diamond 318. This is to ensure that the key fob 340 is rotated the full 360 degrees in 1 degree increments, and data is collected for each key fob 340 position. Once the fob 340 is rotated to a position for which data has already been collected, the process 300 includes ending the Fob Factor test, as indicated by block 320.

The data collected from the one-way Fob Factor test provides a range of FOB RF signal strength outputs with which the key fob 340 is functional. More specifically, the Fob Factor test provides data regarding polarization, maximum power or minimum sensitivity, and directionality of the RF function of the key fob.

Turning to FIG. 3C, which illustrates the RKS characterization system configured for a two-way fob factor test. It should be appreciated that this same setup may be utilized for both one-way and two-way Fob Factor testing. The different configurations of FIGS. 2B, 3B, and 3C, are merely illustrations of certain embodiments and are not intended to be limiting. As illustrated, this embodiment of the RKS characterization system includes a testing chamber 352, a vehicle 322, a remote key fob 340, and an RF transceivers 332 in communication with at least two antennas 330, 334. More specifically, in this embodiment, the RF transceiver 332 stores, controls, and replays both the key fob signal and the vehicle signal through the two antennas 330, 334.

More specifically, in certain embodiment, the RKS characterization system includes testing for a feedback response from the vehicle received at the key fob 340. In an example of such an embodiment, the key fob 340 is pressed to send a command to the vehicle 322, for example an unlock command. The vehicle 322 receives the unlock command, unlocks the vehicle, and sends a confirmation command back to the key fob 340. In one embodiment the confirmation command is a flash of a light emitting diode (LED) within the key fob 340. For such an embodiment, the system would include two cameras 336, 338 to capture any response by the key fob 340 and the vehicle 322.

In an alternative embodiment, the efficiency of the above described testing is further increased by placing the vehicle and the key fob in separate chambers that both include turntables. In this embodiment, all three factor tests are run simultaneously. That is, the Fob Factor, the Person Factor, and the Vehicle Factor are all tested at the same time. In certain embodiments, the chamber for the key fob is substantially smaller than the chamber for the vehicle.

Figure 4:
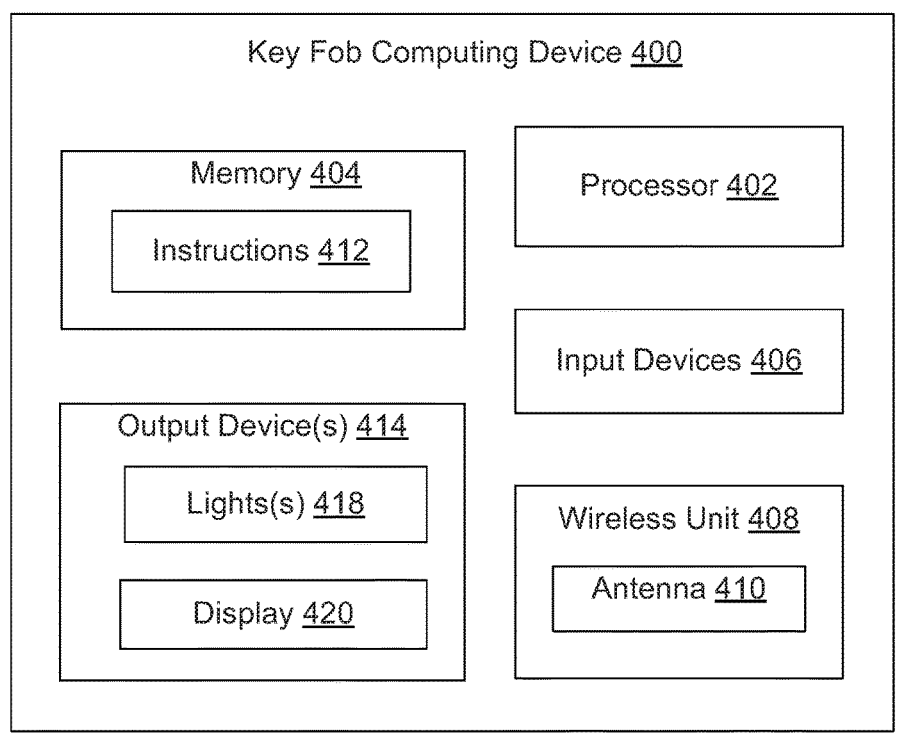
FIG. 4 is a block diagram including components of one embodiment of a computing device included in a key fob of the remote keyless entry characterization system of FIG. 1, in accordance with certain embodiments.
Figure 5:
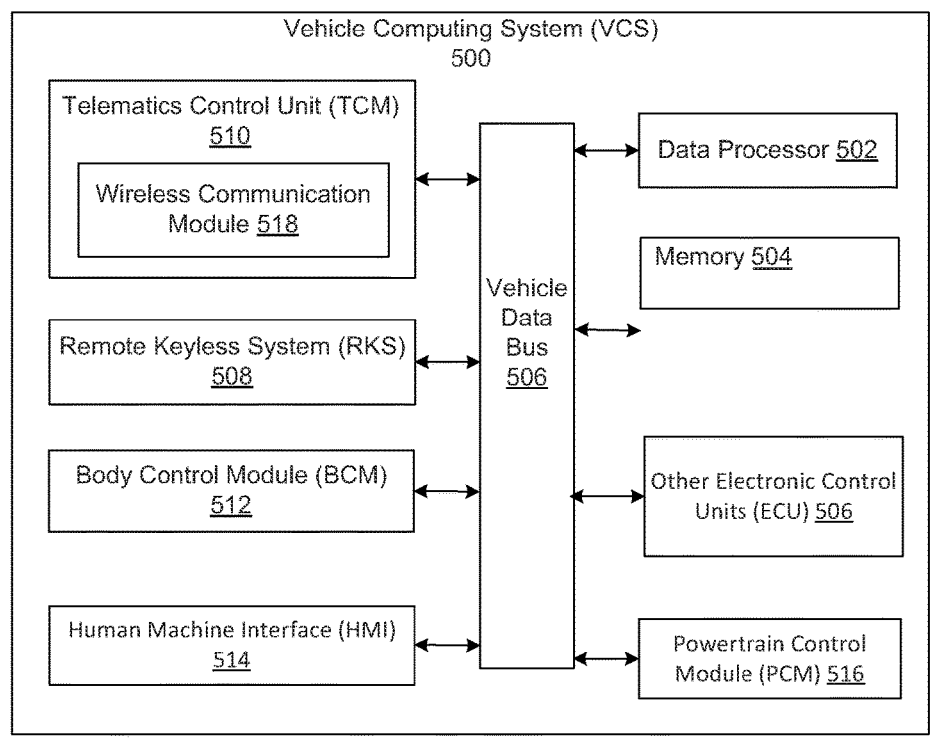
FIG. 5 is a block diagram including components of one embodiment of a computing device included in a vehicle of the remote keyless entry characterization system of FIG. 1, in accordance with certain embodiments.
Figure 6:
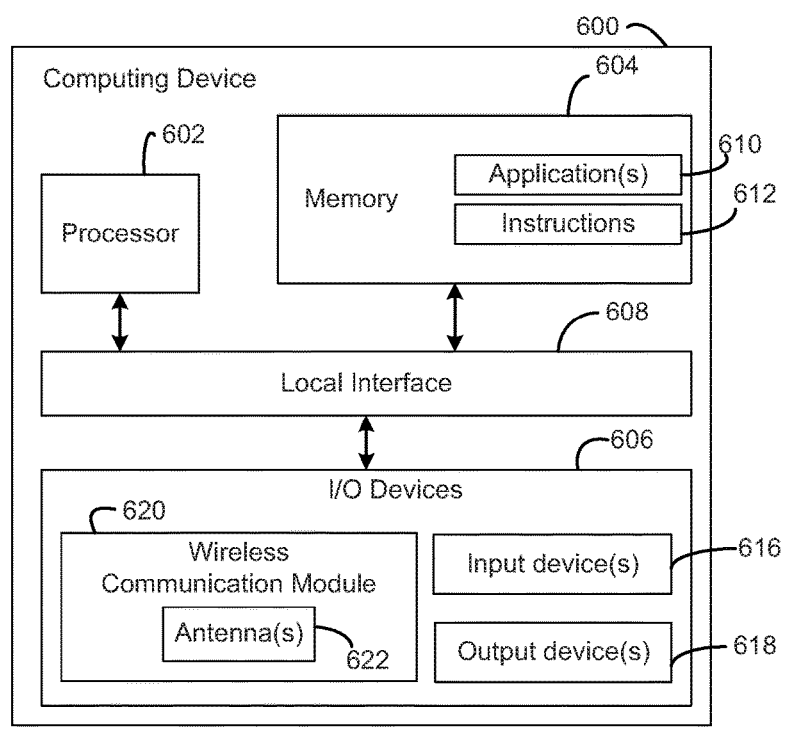
FIG. 6 is a block diagram including components of one embodiment of a computing device included in a simulation control system of the remote keyless entry characterization system of FIG. 1, in accordance with certain embodiments.

Turning to FIGS. 4, 5, and 6, which illustrate various computing devices included within various embodiments of the RKS characterization system of the present disclosure. As described above, the RKS characterization system includes at least a testing chamber 252, 352, a key fob 240, 340, a vehicle 222, 322, an RF transceiver 232, 332, and a simulation control system 228, 328, which is represented as a PC in the embodiments described above. FIG. 4 depicts an example embodiment of a computing device 400 included in the key fob 240, 340. FIG. 5 depicts an example embodiment of a computing device included within the vehicle 222, 322. FIG. 6 depicts an example computing device included within the simulation control system, such as for example within the PC 228, 328 used to control the RF transceivers 232, 332 and carry out the Vehicle Factor test and the Fob Factor test described above in connection with FIGS. 2A, 2B, 3A, 3B, and 3C.

Turning to FIG. 4, in one embodiment, a computing device 400 within the key fob 240, 340 can be configured to provide a user with remote, keyless control of the various vehicle operations or functions and communicate command inputs entered into the key fob 240, 340 to the vehicle 222, 322. As shown in FIG. 4, the key fob computing device 400 includes a data processor 402 and a memory 404 for facilitating the key fob operations. In certain embodiments, the memory 404 stores a set of instructions 412. The processor 402 is configured to communicate with main memory 404, access the set of instructions 412, and execute the set of instructions 412 to generally control operations of the computing device 400 pursuant to the instructions 412. In particular, the memory 404 includes instructions 412 for execution by the processor 402 to facilitate interactions between the key fob 240, 340 and the vehicle 222, 322.

The processor 402 is a hardware device and can be any custom made or commercially available processor, a central processing unit (CPU), an auxiliary processor among several processors associated with the computing device 400, a semiconductor based microprocessor (in the form of a microchip or chip set), another type of microprocessor, a microcontroller, a programmable logic array, an application-specific integrated circuit, a logic device, or other electronic device for processing, inputting, outputting, manipulating, storing, or retrieving data. or generally any device for executing software instructions. When the computing device 400 is in operation, the processor 402 can be configured to execute software instructions 412 stored within the memory 404, to communicate data to and from the memory 404, and to generally control operations of the computing device 400 pursuant to the software. The software, in whole or in part, but typically the latter, may be read by the processor 402, buffered within the processor 402, and then executed.

The memory 404 includes any one, or a combination of, volatile memory elements (e.g., random access memory (RAM, such as DRAM, SRAM, SDRAM, etc.)) and non-volatile memory elements (e.g., ROM, hard drive, tape, CDROM, etc.). Moreover, the memory 404 may incorporate electronic, magnetic, optical, and/or other types of storage media. The memory 404 may include a computer readable medium configured to store software for implementing the systems and/or the techniques described herein. In some cases, the memory 404 can have a distributed architecture where various components are situated remote from one another, but are still accessed by the processor 402.

As shown in FIG. 4, the key fob computing device 400 also includes a wireless unit 408 with an antenna 410 for communicating with the vehicle 222, 322, and in certain embodiments for connecting to the various wireless networks. For example, the unit 408 may include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network.

The key fob 240, 340 also includes a plurality of input devices 406 (also referred to as "vehicle buttons") that can be operated by a user to convey operational commands to the vehicle 222, 322. In certain embodiments, each input device 406 can be associated with at least one vehicle function, including by not limited to, door lock, unlock, engine start, etc. The input devices 406 can be any type of input device, including, but not limited to, buttons or push buttons, sliders, switches, knobs, dials, and/or touch input devices.

As shown in FIG. 4, the key fob 240, 340 further includes one or more output devices 414 for providing a visual, audible, and/or haptic output in response to certain inputs received by the key fob 240, 340. For example, the key fob 240, 340 may be configured to output a signal upon receiving a user-selection of an input 406 on the key fob 240, 340 to execute a command, and an output may be provided upon receiving confirmation from the vehicle 222, 322 that the vehicle command has been performed. In some embodiments, the one or more output devices 414 can be configured to provide a different visual output, or cue, depending on the input received at the key fob 240, 340. In such cases, the output devices 414 can include lights 418 such as light emitting diodes (LEDs). In certain embodiments, the key fob 240, 340 may include multiple LEDs, and each LED may be configured to output a different colored light to respectively represent a different input. In certain embodiments, the key fob 240, 340 may include a display 220 as an output device. In other embodiments, the one or more output devices 414 includes at least one haptic device (not shown), such as an actuator or electro-mechanical motor, that vibrates, buzzes, or otherwise provides a haptic cue, or output, in response to inputs received at the key fob 240, 340.

Turning to FIG. 5, which depicts one embodiment of an exemplary vehicle computing system (VCS) 500 that may be included in the vehicle 222, 322, for example, as part of a vehicle electronics system or an infotainment system of the vehicle 222, 322, in accordance with embodiments. The VCS 500 may be an infotainment system such as the SYNC® system manufactured by FORD MOTOR COMPANY®. Other embodiments of the VCS 500 can include different, fewer, or additional components than those described below and shown in FIG. 5. In embodiments, the VCS 500 can be configured to communicate with the key fob 240, 340 and receive, process, and execute the command inputs received therefrom.

As shown in FIG. 5, the VCS 500 can include a data processor 502 and a memory, or data storage device 504 (similar to the processor 402 and memory 404 described above in connection with FIG. 4) and a vehicle data bus 506. In embodiments, the VCS 500 can comprise a general purpose computer that is programmed with various programming instructions or modules stored in the data storage device 504 (e.g., electronic memory), or elsewhere. The VCS 500 further includes various electronic control units (ECUs) that are responsible for monitoring and controlling the electrical systems or subsystems of the vehicle 222, 322. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 500 include a remote keyless system (RKS) 508, a telematics control unit (TCM) 510, a body control module (BCM) 512, a human-machine interface (HMI) 514, a power train control module (PCM) 516, and various other ECUs 506.

The ECUs of the VCS 500 can be interconnected by the vehicle bus 506 (such as, e.g., a controller area network (CAN) bus), which passes data to and from the various ECUs, as well as other vehicle and/or auxiliary components in communication with the VCS 500. Further, the data processor 502 can communicate with any one of the ECUs and the data storage device 504 via the data bus 506 in order to carry out one or more functions, including the functions associated with methods 100, 200, 300 shown in FIGS. 1, 2A, and 3A, or to support interactions with the key fob 240, 340.

The remote keyless system (RKS) 508 is an ECU configured to for controlling and monitoring remote, keyless interactions between the key fob 240, 340 and the vehicle 222, 322. The RKS 508 can include a remote keyless entry system and in some cases, a remote keyless ignition system. In the latter case, the RKS 508 may also be referred to as a "passive entry passive start (PEPS) system." In some embodiments, the RKS 508 is a separate, stand-alone ECU that is interconnected to the BCM 512, PCM 516, TCU 510, and other ECUs of the vehicle 222, 322 via the vehicle bus 506 in order to carry out the RKS/PEPS operations. For example, the RKS 508 may receive vehicle commands from the key fob 240, 340 via the TCU 510, process the commands to identify the appropriate ECU for carrying out the command, send the command to the identified ECU, and confirm performance of the command. In other embodiments, the RKS 508 may be comprised of multiple segments that are incorporated into various ECUs of the VCS 500, such as, for example, the BCM 512, the PCM 516, and/or the TCU 510, to process the RKS/PEPS commands received at each ECU. In still other embodiments, the RKS 508 may be included within one ECU, such as, e.g., the TCU 510, in order to handle or process RKS/PEPS commands as they are received by the TCU 510.

The body control module (BCM) 512 is an ECU for controlling and monitoring various electronic accessories in a body of the vehicle 222, 322. In embodiments, the BCM 512 is an ECU that controls the doors of the vehicle 222, 322, including locking, unlocking, opening, and/or closing said doors. In some embodiments, the BCM 512 also controls the power windows, power roof (e.g., moonroof, sunroof, convertible top, etc.), and interior lighting of the vehicle 222, 322. The BCM 512 may also control other electronically-powered components in the body of the vehicle 222, 322, such as, for example, air-conditioning units, power mirrors, and power seats. In cases where the BCM 512 only controls and monitors the doors of the vehicle 222, 322, the BCM 512 may be referred to as the door control unit (DCU), as will be appreciated. The BCM 512 can be configured to implement commands received from the key fob 240, 340 that are related to the doors, windows, or other body components controlled by the BCM 512.

The power train control module (PCM) 516 is an ECU for controlling and monitoring the engine and transmission of the vehicle 222, 322. In some embodiments, the PCM 516 can be separated into two separate ECUs, specifically an engine control unit and a transmission control unit. In either case, the PCM 516 can be configured to control starting and stopping of the engine of the vehicle 222, 322, and may implement commands to start the engine received from the key fob 240, 340.

The telematics control unit (TCU) 510 is an ECU for enabling the vehicle 222, 322 to connect to various wireless networks, including, for example, GPS, WiFi, cellular, Bluetooth, NFC, RFID, satellite, and/or infrared. In embodiments, the TCU 510 (also referred to as a "vehicle telematics unit") includes a wireless communication module 518 comprising one or more antennas, radios, modems, receivers, and/or transmitters (not shown) for connecting to the various wireless networks. For example, the wireless communication module 518 can include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network. The TCU 510 can also be configured to control tracking of the vehicle 222, 322 using latitude and longitude values obtained from a GPS satellite. In a preferred embodiment, the wireless communication module 518 includes a Bluetooth or other short-range receiver (not shown) for receiving vehicle commands and/or data transmitted by the key fob 240, 340, and a Bluetooth or other short-range transmitter (not shown) for sending data to the key fob 240, 340.

In embodiments, the TCU 510 receives external data, including command inputs from the key fob 240, 340, via the wireless communication module 518 and provides the external data to an appropriate ECU of the VCS 500. For example, if the TCU 510 receives a lock door command, the TCU 510 sends the command to the BCM 512 via the vehicle bus 506. Likewise, if the TCU 510 receives a start engine command, the TCU 510 sends the command to the PCM 516 via the vehicle bus 506. In some embodiments, the TCU 510 also receives internal data from other ECUs of the VCS 500 and/or the data processor 502, with instructions to transmit the internal data to the vehicle 222, 322, or another component of the remote RKS characterization system of the present disclosure.

The human-machine interface (HMI) 514 (also referred to as a "user interface") can be an ECU for enabling user interaction with the vehicle 222, 322 and for presenting vehicle information to the vehicle operator or driver. Though not shown, the HMI 514 can comprise an instrument panel (IP), a media display screen, as well as one or more input devices and/or output devices for inputting, entering, receiving, capturing, displaying, or outputting data associated with the vehicle computing system 500, the methods 100, 200, 300 shown in FIGS. 1A, 2A, and 3A, or the techniques disclosed herein. The HMI 514 can be configured to interact with the other ECUs of the VCS 500 and/or the data processor 502 via the data bus 506 in order to provide information or inputs received via the HMI 514 to an appropriate component of the VCS 500 and to present, to the vehicle operator or driver, information or outputs received from the various components of the VCS 500.

Turning to FIG. 6, which illustrates an example embodiment of a computing device 600 included within the simulation control system, which is configured to control various operations or functions of the remote RKS characterization system, in accordance with embodiments. More specifically, in some embodiments, portions of the RKS characterization system are implemented in software, as an executable program, and are executed by one or more special or general purpose digital computer(s), such as a mainframe computer, personal computer (desktop, laptop, or tablet-type computer), personal digital assistant, workstation, minicomputer, computer network, virtual network, Internet cloud computing facility, mobile telephone or smartphone, tablet, or other handheld computing device. In such cases, the simulation control system including computing device 600 may be representative of any computer in which the RKS characterization system resides or partially resides.

As described above, in certain embodiments, the simulation control system operates with the various components of the RKS characterization system to carry out testing procedures and collecting data from the RKS characterization system. In certain embodiments, the various components of the simulation control system may be implemented using software executable by one or more servers or computers, such as a computing device 600 with a processor 602 and a memory 604 within the PC 228, 328 and the testing hardware components (such as the RFI testing hardware). For example, processes 100, 200, 300 may be implemented using the computing device 600, or more specifically, through interactions between various components of the RKS characterization system that are facilitated by software executing on one or more computer processors 502 associated with said components.

As shown in FIG. 6, the computing device 600 generally includes a processor 602 (similar to the processor 402, 502 described above), a memory 604 (similar to the memory 404, 504, described above). In certain embodiments, the computing device 600 includes a special digital signal processor designed to operate the RF transceivers of the RKS characterization system. The processor 602 is configured to communicate with the memory 604, access the set of instructions 612, and execute the set of instructions 612 to generally control operations of the computing device 600 pursuant to the instructions 612. In particular, the memory 604 includes instructions 612 for execution by the processor 602 to conduct the testing procedures of the RKS characterization system. In certain embodiments, the memory 604 may be configured to store one or more separate programs or applications 610 (e.g., source program, executable program (object code), or script) comprising ordered listings of executable instructions for implementing logical functions associated with the RKS characterization system.

Computing device 600 also includes a local interface 608 communicatively coupled to the various components of the computing device 600. The local interface 608 may be, for example, but is not limited to, one or more buses or other wired or wireless connections, as is known in the art. The local interface 608 may have additional elements, which are omitted for simplicity, such as controllers, buffers (caches), drivers, repeaters, and receivers, to enable communications. Further, the local interface 608 may include address, control, and/or data connections to enable appropriate communications among the other computer components.

The computing device 600 also includes various input/output (I/O) devices. The I/O devices 606 may include interactive hardware that is internal to the computing device 600, or external and connected wirelessly or via connection cable and/or I/O ports. The I/O devices 606 can include input devices 616, for example but not limited to, input modules for programmable logic controllers (PLCs), a keyboard, mouse, scanner, microphone, touchscreens, stylus, radio-frequency device readers, input hardware (e.g., buttons, switches, sliders, knobs, dials, and the like; such as, for example, the vehicle input devices 506 and the key fob input device 406), etc. Furthermore, the I/O devices 606 may also include output devices 618, for example but not limited to, output modules for PLCs, displays, haptic devices (e.g., actuators), lights audio output devices (e.g., speakers), etc.

The I/O devices 606 further comprise devices that communicate with both inputs and outputs, including, but not limited to, a wireless communication module 620. The wireless communication module 620 includes one or more antennas 622 configured to wireless transmit signals to, and/or receive signals from, at least other components of the RKS characterization system. The wireless communication module 620 further includes one or more receivers, transmitters, and/or transceivers (not shown) that are communicatively coupled to the one or more antennas 622 for processing the received signals, providing the transmitted signals, or otherwise facilitating wireless communication with other components of the RKS characterization system. The wireless communication module 620 may also include a modulator/demodulator modem, a bridge, and/or a router.

The exact type of wireless communication technology included in the wireless communication module 620 can vary depending on the computing device 600 and may include at least one of short-range wireless communication technology (such as, e.g., radio frequency (RF), Bluetooth, infrared, and/or NFC technology) and longer-range or broadband wireless communication technology (such as, e.g., WiFi, WiMax, other wireless Ethernet, cellular, GPS, and/or satellite technology). In some cases, the wireless communication module 620 may include more than one antenna and corresponding transceiver in order to communicate over different wireless networks.

In some cases, the computing device 600 can also include hardware (such as the RFI testing hardware described above) for implementing one or more aspects of the techniques described herein. In such cases, the hardware utilizes any of the following technologies, or a combination thereof, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In certain embodiments, the process descriptions or blocks in the figures can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle remote keyless characterization system comprising:
   a testing chamber configured to rotate a vehicle to a plurality of positions;
   a RF transceiver configured to capture and transmit a key fob RF signal at each position, and
   a simulation control system configured to, at each position:
   record an transmitted RF signal level and antenna polarization,
   if the vehicle responds, decrease the RF level, and
   if the vehicle does not respond, increase the RF level.

2. The vehicle remote keyless characterization system of claim 1, a first antenna in communication with the RF transceiver outside of the testing chamber captures the RF signal from a key fob, and a second antenna inside of the testing chamber transmits the captured RF signal to the vehicle.

3. The vehicle remote keyless characterization system of claim 1, wherein the testing chamber is an RF clean environment including RF absorbers.

4. The vehicle remote keyless characterization system of claim 1, wherein the testing chamber includes a turntable which rotates the vehicle each of the plurality of positions.

5. The vehicle remote keyless characterization system of claim 4, wherein the turntable rotates the vehicle 360 degrees in 1 degree increments.

6. The vehicle remote keyless characterization system of claim 1, further comprising the RF transceiver configured to capture an RF signal from a key fob, wherein the key fob is inside the testing chamber, and transmit the captured RF signal to the vehicle outside of the testing chamber, at each of the plurality of positions; and a simulation control system configured to collect data regarding each key fob transmission.

7. A vehicle remote keyless characterization system comprising:
   a testing chamber configured to rotate a key fob to a plurality of positions;
   a RF transceiver configured to capture and transmit a key fob RF signal at each position; and a simulation control system configured to, at each position:
  record a transmitted RF signal level and antenna polarization,
  if the vehicle responds, decrease the RF level, and
  if the vehicle does not respond, increase the RF level.

8. The vehicle remote keyless characterization system of claim 7, further comprising a first antenna in communication with the RF transceiver outside of the testing chamber captures a feedback RF signal from the vehicle, and a second RF transceiver inside of the testing chamber to transmit the captured RF signal to the key fob.

9. The vehicle remote keyless characterization system of claim 7, wherein the testing chamber is an RF clean environment including RF absorbers.

10. The vehicle remote keyless characterization system of claim 7, wherein the testing chamber includes a turntable which rotates the vehicle each of the plurality of positions.

11. The vehicle remote keyless characterization system of claim 10, wherein the turntable rotates the vehicle 360 degrees in 1 degree increments.

12. The vehicle remote keyless characterization system of claim 7, further comprising the RF transceiver configured to capture the RF signal from the key fob outside of the testing chamber, and transmit the captured RF signal to the vehicle inside of the testing chamber at each of the plurality of positions; and the simulation control system configured to collect data regarding each key fob transmission.

* * * * *